US011945012B2

(12) United States Patent
Korostelev

(10) Patent No.: US 11,945,012 B2
(45) Date of Patent: Apr. 2, 2024

(54) ACOUSTIC EMITTER DEVICE FOR REGULAR CLEANING OF A DOWNHOLE FILTER

(71) Applicant: Sergey Victorovich Korostelev, g. Komsomolsk-na-Amure (RU)

(72) Inventor: Sergey Victorovich Korostelev, g. Komsomolsk-na-Amure (RU)

( * ) Notice: Subject to any disclaimer, the term of this patent is extended or adjusted under 35 U.S.C. 154(b) by 822 days.

(21) Appl. No.: 16/966,854

(22) PCT Filed: Dec. 12, 2018

(86) PCT No.: PCT/RU2018/000812
§ 371 (c)(1),
(2) Date: Jul. 31, 2020

(87) PCT Pub. No.: WO2019/151895
PCT Pub. Date: Aug. 8, 2019

(65) Prior Publication Data

US 2021/0039143 A1 Feb. 11, 2021

(30) Foreign Application Priority Data

Feb. 2, 2018 (RU) .......................... RU 2018 04161

(51) Int. Cl.
*B08B 9/04* (2006.01)
*B08B 9/043* (2006.01)
*E21B 37/08* (2006.01)

(52) U.S. Cl.
CPC ............ *B08B 9/0433* (2013.01); *E21B 37/08* (2013.01); *B08B 2203/0288* (2013.01)

(58) Field of Classification Search
CPC ......... B08B 9/04; B08B 9/043; B08B 9/0433; B08B 9/045; B08B 9/047; B08B 3/10;
(Continued)

(56) References Cited

U.S. PATENT DOCUMENTS 5,727,628 A 3/1998 Patzner
2014/0301164 A1* 10/2014 Mandal .................... G01V 1/52
367/35
2016/0076340 A1 3/2016 Abramova et al.

* cited by examiner

*Primary Examiner* — David G Cormier
(74) *Attorney, Agent, or Firm* — John Alumit

(57) ABSTRACT

The invention relates to methods for restoring well productivity and to devices for cleaning downhole mesh filters without disassembling water-lifting equipment. Well productivity is restored and maintained using an acoustic method based on generating an ultrasonic fluid flow directed at a filter to clean the pre-filter zone of clogging deposits by moving an acoustic emitter along the filter. The acoustic emitter is placed within the lower portion of a casing string, downstream of a submersible downhole pump, and is connected to a means for delivering thereof into the filter zone. The acoustic emitter device comprises an ultrasonic transducer block, which is disposed between two supporting plates and is connected therewith by a rotary unit and an electric motor. The ultrasonic transducer block is configured in the form of two ultrasonic vibration systems located inside separate cylindrical housings positioned transverse to the axis of the filter, while the working surfaces of the waveguide tools of the vibration systems are oriented in the opposite directions toward the inside surface of the filter. The rotary unit and electric motor are connected to the ultrasonic transducer block and are mounted on the upper and lower supporting plates, respectively. The faces of the supporting plates are perpendicular to the filter axis and have bracing elements along the perimeter for anchoring inside the filter. The electric motor is used to facilitate rotary oscillations of the ultrasonic transducers within a 180-degree range (similar to a clock pendulum). In this case, the waveguide tools sweep the inner surface of the filter with an ultrasonic fluid flow along the circumference of the filter within a 360-degree range. Concurrently with this process,
(Continued)

the delivery means causes the acoustic emitter to perform reciprocating movement along the filter axis, thus, providing a subsequent treatment of the entire inner surface of the downhole filter with a directed ultrasonic fluid flow, as well as a regular cleaning of the pre-filter zone of the well without disassembling the water-lifting string and submersible pump.

1 Claim, 3 Drawing Sheets

(58) Field of Classification Search
CPC ... B08B 3/102; B08B 3/12; B08B 2203/0288; B08B 2209/00; B08B 2209/005; B08B 7/026; B08B 7/028; E03C 1/30; E03C 1/302; E03F 9/00; E03F 9/002; E03F 9/005; E21B 37/00; E21B 37/08; E21B 28/00
See application file for complete search history.

View A

ACOUSTIC EMITTER DEVICE FOR REGULAR CLEANING OF A DOWNHOLE FILTER

FIELD OF THE INVENTION

The proposed invention relates to the oil and gas industry as well as water utilization system, and specifically, to methods for restoring the well productivity and devices for cleaning a filter under the downhole conditions.

BACKGROUND OF THE INVENTION

Since the well productivity (specific yield) decreases over time due to clogging of the mesh filter and surrounding gravel pack with various types of colmatants (contaminants), it becomes necessary to perform an unscheduled well shutdown for a periodic cleaning of the filter and pre-filter zone of the well.

An acoustic method of filter decolmatation is known, which utilizes magnetostrictive or piezoelectric ultrasonic emitters (V. S. Alekseev and V. G. Grebennikov, Restoring an Output of Water-supply Wells [in Russian], Agropromizdat, Moscow (1987), p. 156). The method provides a wide range of emitted oscillation frequencies and the ability to generate a high-energy liquid cavitation flow, which allows destroying various types of colmatants. In addition, transmission of ultrasonic vibrations creates a disinfecting effect and allows suppressing the growth of biological organisms in a liquid medium. The disadvantage of this method is the need to dismantle the water-lifting equipment every time the well productivity decreases to a critical level.

A method and device for cleaning a pre-filter zone of the vertical water-supply wells are known, which do not require dismantling the water-lifting equipment (RF Patent 2612046-prototype). The well design represents a casing string, the lower portion of which contains a pre-filter zone in the form of a slot-type mesh filter, while the external space around the filter is filled with a gravel pack. Located inside the casing string is water-supply equipment consisting of a pipeline for pumping water with a submersible pump installed at the end thereof above the filter level. The device comprises an acoustic emitter and lifting equipment for delivering thereof to the inner space of the filter, which are respectively connected via an electric cable with a control panel of the lifting equipment and high-frequency electric oscillator. Both the control panel and electric oscillator are located above ground. The lifting equipment is mounted on the lower portion of the submersible pump and causes the acoustic emitter to perform reciprocating movements (up and down) along the axis of the downhole filter. Such method allows performing regular cleaning of the pre-filter zone of the well at any suitable point of time.

An acoustic emitter comprises a chain of interconnected sectors (blocks) located along the filter axis and made of waterproof cylindrical housings, the axes of symmetry of which are perpendicular to the filter axis. Installed inside each housing are two ultrasonic vibration systems, which operate based on the use of piezoelectric (piezoceramic) or magnetostrictive transducers converting electric oscillations into mechanical. The working surfaces of the waveguide tools (sources of ultrasonic vibrations) are oriented in the opposite directions toward the inner surface of the filter. The axes of symmetry of the blocks are located relative to each other at an angle determined by dividing 180° by the number of such blocks (fan-shaped style). Depending on the area of the working surface of the waveguide tool and, hence, the size of the ultrasonic flow projection (from one source) onto the inner surface of the filter, the number of installed blocks is selected such that by moving the acoustic emitter, the total ultrasonic flow (from all sources) would cover the entire inner surface of the filter. A chain of blocks in the form of a string is secured along the axis of the filter using two sets of bracing elements in the form of flexible centering rods arranged in a fan-shape fashion perpendicular to the filter axis in the upper and lower portions of the string.

The disadvantage of such acoustic emitter has to do with the fact that in case of a small inner diameter of the downhole filter, only small-sized ultrasonic vibration systems with limited working surface of the waveguide tool can be used. Such ultrasonic vibration sources have small projected dimensions of ultrasonic flow onto the filter, which requires a large number of ultrasonic transducer blocks and, hence, significantly complicates the design of the acoustic emitter.

SUMMARY OF THE INVENTION

The objective of the proposed invention is to eliminate the disadvantages of the prototype, while solving the following tasks:

- reduce the number of ultrasonic transducer blocks to one;
- increase the capacity of ultrasonic transducers;
- increase the working surface area of the waveguide tool and, hence, the projected area of the ultrasonic flow onto the inner surface of the filter; and
- improve the reliability of the acoustic emitter.

The technical result is achieved by using a single ultrasonic transducer block with supporting plates, a rotary unit, and an electric motor installed in the upper and lower sections thereof. The device is embodied as a string assembled of the following sequentially interconnected components: an upper supporting plate, a rotary unit, an ultrasonic transducer block, an electric motor, and a lower supporting plate. The supporting plates are located perpendicular to the filter axis and have bracing elements arranged around the perimeter. The electric motor is used to facilitate rotary oscillations of the ultrasonic transducer block within a 180-degree range, similar to a clock pendulum, while the ultrasonic fluid flows from the working surfaces of the waveguide tools sweep the inner surface of the filter within a 360-degree range. Concurrently with this process, the delivery means causes the acoustic emitter to perform reciprocating movements along the axis of the filter. Thus, the successive treatment of the entire inner surface of the downhole filter with ultrasonic fluid flows is enabled along with regular cleaning of the pre-filter zone of the well without dismantling the water-lifting equipment.

As an example, an ultrasonic vibration system having high amplitude of vibration (see RF patent 2465071) is used as an ultrasonic transducer. The vibration system is shaped as a rotary body and comprises at least two disk-type piezoelectric elements, located between the reflecting and concentrating plates, and a disk-shaped waveguide tool mounted at the end of the body.

BRIEF DESCRIPTION OF THE DRAWINGS

The invention is illustrated by the drawings (FIGS. 1, 2, and 3), which depict a specific example of the design of the device, which clearly demonstrates the possibility of achieving the technical result.

DETAILED DESCRIPTION OF THE INVENTION

Figure 1:
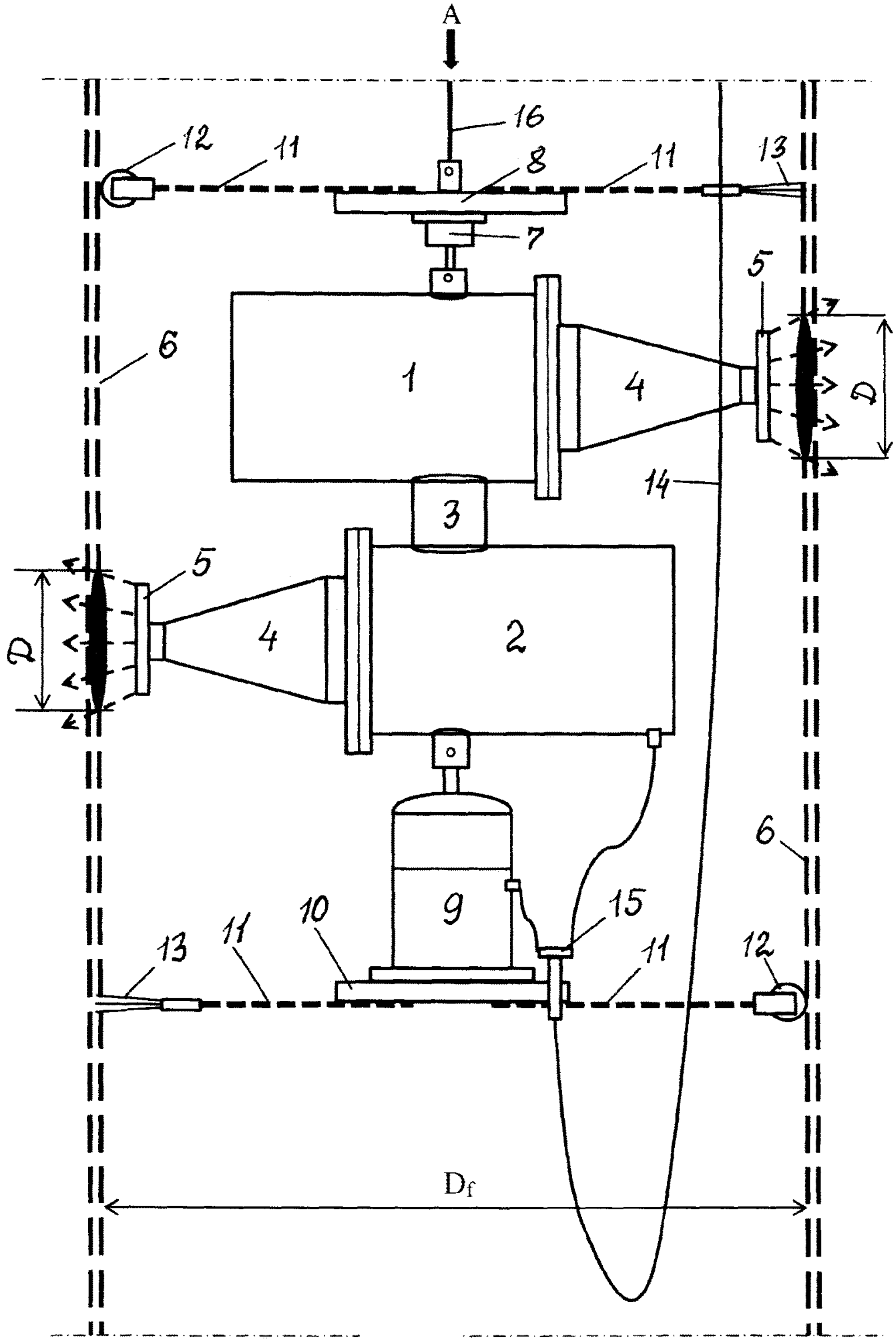
FIG. 1—general side view of the acoustic emitter device.

In the embodiment of the invention, used as an example, high-capacity ultrasonic vibration systems with high amplitude of vibrations require the use of the large-diameter disk-type piezoelectric elements, which results in an increase in the overall dimensions of the vibration system as a whole. In order to be placed within an acoustic emitter, the ultrasonic transducer block (FIG. 1) is made of two cylindrical housings (upper (1) and lower (2)) interconnected by a pipe (3). The axes of symmetry of housings (1) and (2) are parallel and shifted along the filter axis. A single ultrasonic vibration system is installed within each of the housings (1) and (2). The concentrating plates (4) of the systems are oriented in the opposite directions to ensure that the working surfaces of waveguide tools (5) are located directly in front of the inner surface of filter (6). Housing (1) is attached to an upper supporting plate (8) via a rotary unit (7), while housing (2) is attached to a lower supporting plate (10) via an electric motor (9). Bracing elements (11) are located along the perimeter of the supporting plates (8) and (10) and can be embodied, as an example, in the form of a Bowden cable. At the ends of such elements, rollers (12) and metal brushes (13) are installed in an alternating manner, resting on the inner surface of filter (6). The ultrasonic transducer block (housings (1) and (2)) and electric motor (9) are connected via an electric cable (14) and a splitter (15) to a high-frequency electric oscillator and a control panel of electric motor (9), which are located above ground (not shown in FIG. 1). A connecting element (16) connects the acoustic emitter to the delivery means (not shown in FIG. 1). The dotted arrows show the direction of the ultrasonic fluid flow aimed toward the inner surface of filter (6) (diameter—$D_f$).

Figure 2:
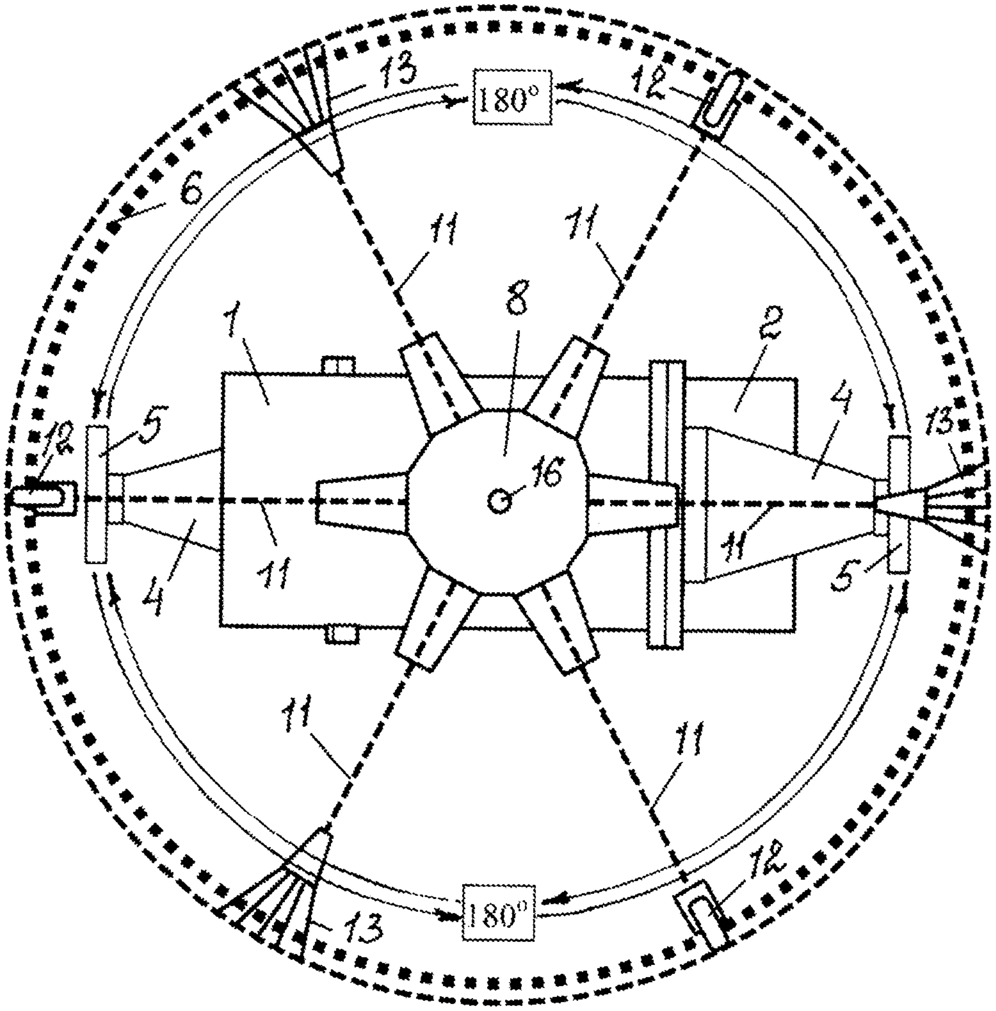
FIG. 2—top view (A) of the acoustic emitter device shown in FIG. 1.

As an example, FIG. 2 shows a supporting plate (8) with six bracing elements (11) (supporting plate (10) has a similar layout), which ensure centering and ability of the device to move along the axis of filter (6), while preventing the rotation of supporting plates (8) and (10) around the filter axis. Circular arrows show the directions of rotary oscillations of the ultrasonic transducer block (housings (1) and (2)) within a 180-degree range.

Figure 3:
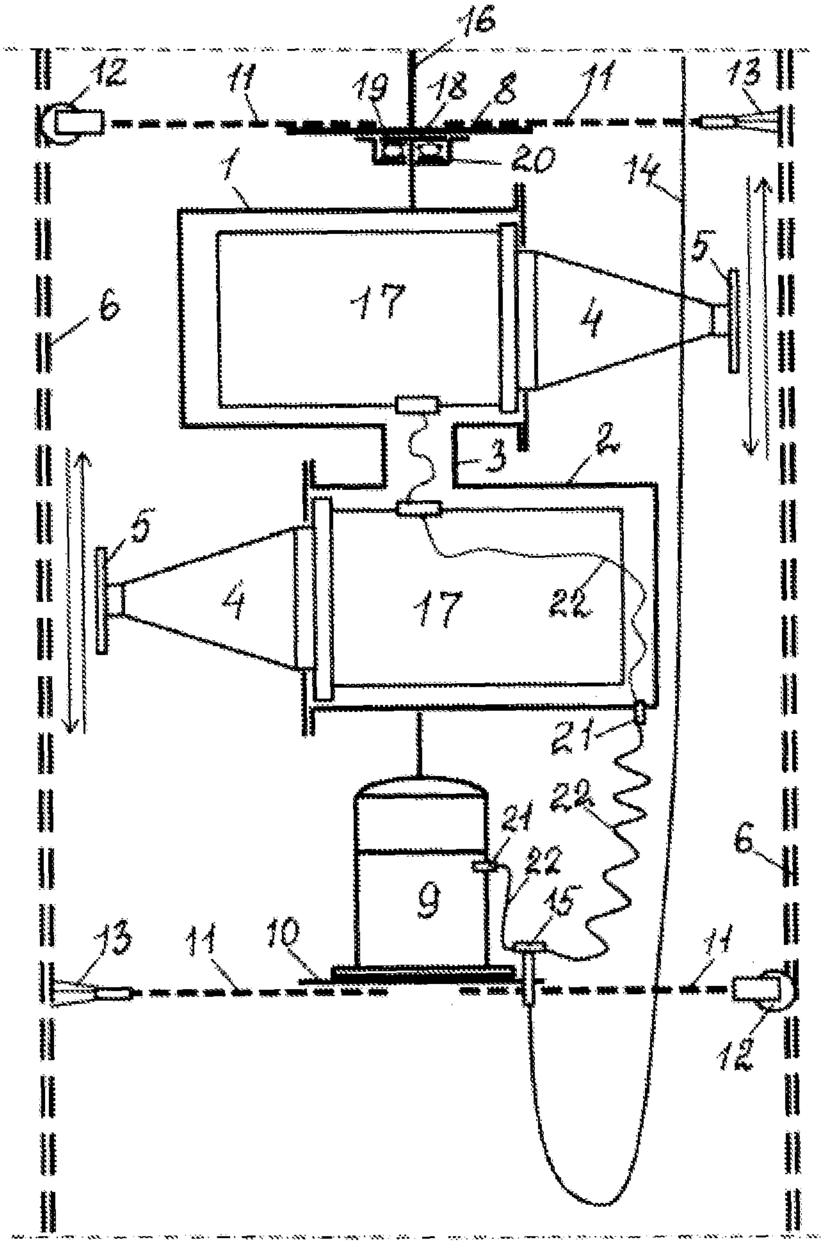
FIG. 3—sectional view of the arrangement of the acoustic emitter components according to FIG. 1.

In addition to the parts shown under the same numbers as in FIGS. 1 and 2, the acoustic emitter component assembly and placement diagram (FIG. 3) depicts the following elements: two ultrasonic vibration systems (17) located within housings (1) and (2); mushroom-shaped axle (18) of the rotary unit (7), resting with its head on a thrust bearing (19) located within casing (20); waterproof electric connectors (21) connecting splitter (15) of the electric cable (14) to the electric motor (9) and ultrasonic vibration systems (17) using electric wires (22). The upper housing (1) is connected to axle (18) of the rotary unit (7), and casing (20) is attached to the upper supporting plate (8). The lower housing (2) is attached to the shaft of electric motor (9), the base of which is secured to the lower supporting plate (10). The arrows show the movement directions of the acoustic emitter (working surfaces of waveguide tools (5)) along the axis of filter (6).

The proposed device operates as follows.

Once ultrasonic vibration systems (17) are activated, disk-shaped waveguide tools (5) generate two oppositely oriented ultrasonic fluid flows (cone-shaped) directed at the inner surface of filter (6), which form thereon circular projected sections (diameter—D) of ultrasonic vibration impact (see FIG. 1). When the shaft of electric motor (9) performs rotary oscillations (clockwise and vice versa) within a 180-degree range, housings (1) and (2) perform the same type of rotary oscillations and sweep the inner surface of filter (6) with an ultrasonic fluid flow coming from the waveguide tools (5), covering the entire 360-degree range (see FIG. 2). Concurrently with this process, a delivery means (e.g., lifting equipment) mounted on the lower end of the submersible pump, moves the acoustic emitter (up and down) along the axis of filter (6) (see FIG. 3), thus, sweeping the entire inner surface of filter (6) with the ultrasonic fluid flow and cleaning the pre-filter zone of the well.

In order to optimize the filter cleaning procedure using the proposed device, the frequency and power of ultrasonic vibrations should first be determined. The extensive experimental testing has shown that to ensure good cleaning of the slot-type filters and gravel pack of the pre-filter zone of the well, the following operating parameters of the ultrasonic transducers are selected as an option: power density—ranging from 8 to 12 W/cm$^2$, vibration frequency—from 17 to 25 kHz (the most preferable is a resonant frequency of about 20 kHz). In addition, a minimum time (T) of effective exposure to ultrasonic fluid flow required to destroy a certain type of colmatants, and diameter (D) of the flow projection onto the inner surface of the filter (diameter—$D_f$) are determined. Based on these values and sweeping conditions of the entire inner surface of the filter with ultrasonic flow, the following options of the pre-filter zone cleaning procedure are selected:

- option 1: cleaning during one pass of the device along the filter axis. In this case, the rotation parameters of the shaft of electric motor (9) and the movement parameters of the acoustic emitter along the filter axis are calculated according to the following formulas: movement velocity of the ultrasonic flow projection along the filter circumference—D/T; passing time of the projection along the filter circumference—$(\pi \times D_f \times T)/D$; electric motor shaft rotation frequency—$D/((\pi \times D_f \times T)$; and device movement velocity along the filter axis—$(D \times D)/(\pi \times D_f \times T)$, where $\pi$ is the pi-number;
- option 2: step-wise cleaning, when at a certain stage, the device does not move along the filter axis, and the ultrasonic sweeping is performed due to a rotary oscillation of the ultrasonic transducers around the filter axis. In this case, the angular rotation velocity and vibration frequency are selected based on the condition that the total time of exposure to the ultrasonic flow is sufficient for effective cleaning of each section of the inner surface of the filter. Then, the device moves along the filter axis by a distance (D), and the process ultrasonic treatment is repeated for the next circular section of the inner surface of the filter;
- option 3: the ultrasonic sweeping is performed on a continuous basis by repeatedly moving the device along the filter axis with periodic stops at the filter end points (upper and lower), while performing a constant rotary oscillation of the ultrasonic emitter. The axial movement velocity, angular velocity, and frequency of rotary oscillations, as well as the number of passes along the filer axis are determined based on the condition of continuous sweeping the inner surface of the filter with the ultrasonic flow, and guaranteed removal of contaminants (colmatants).

To clean the filters of inclined and horizontal wells, any other delivery means can be used, which moves the acoustic emitter within the filter space, such as a device described in RF Patent 2382178, comprising an electric motor with hydraulic propulsion.

This device allows performing acoustic and chemical cleaning of the filter at the same time by pumping cleaning fluid into the well. An ultrasonic disinfection of the pre-filter zone is also performed. After cleaning the pre-filter zone, contaminated water is pumped out to be subsequently cleaned under the above-ground conditions.

Thus, the proposed technical solution of the acoustic emitter device has the following advantages compared to the prior art:

1. Sweeping of the inner surface of the filter with the ultrasonic fluid flow is performed simultaneously in two directions: along the filter axis and around the filter circumference.
2. Simplicity of the design which utilizes well-known components and tools.
3. Ability to clean the pre-filter zone automatically according to a specified program.
4. Cleaning filters of both vertical and inclined or horizontal wells without dismantling of the water-lifting equipment.
5. Disinfection effect and ability to suppress the growth of biological organisms.
6. Ability to combine the acoustic and chemical methods of filter cleaning.

The invention is industrially applicable.

The invention claimed is:

1. A device for regular cleaning of a downhole filter, comprising an acoustic emitter and a delivery means, characterized in that the acoustic emitter is made up of a series of interconnected upper supporting plate with a rotary unit, a block consisting of two oppositely oriented ultrasonic transducers, and an electric motor mounted on a lower supporting plate for conducting rotary oscillations of the ultrasonic transducer block within a 180-degree range, while the delivery means causes the acoustic emitter to perform reciprocating movements, providing sweeping of an inner surface of the filter with ultrasonic fluid flow simultaneously along an axis and around a circumference of the filter.

* * * * *